INVENTORS
WILLIAM E. BAXTER,
LEWIS E. PALMER,
BY
ATTORNEY

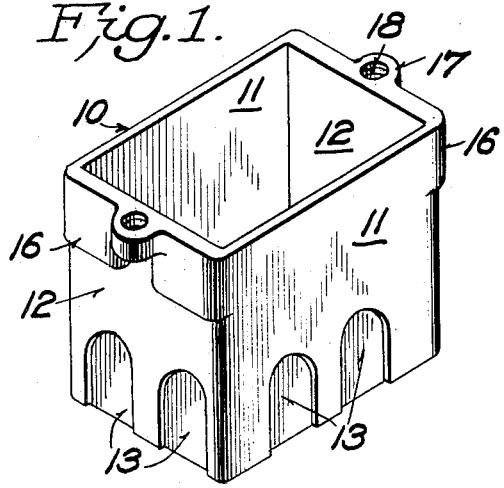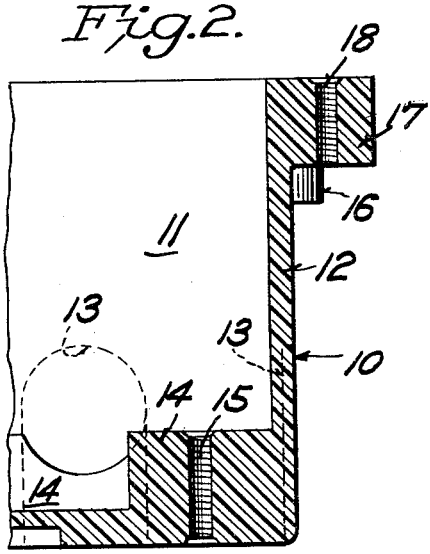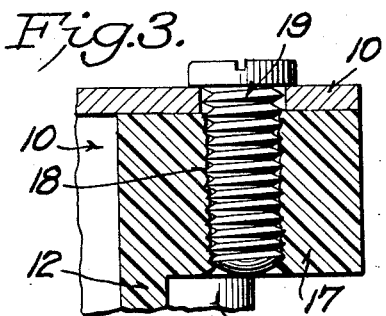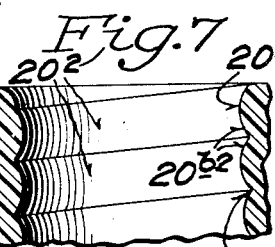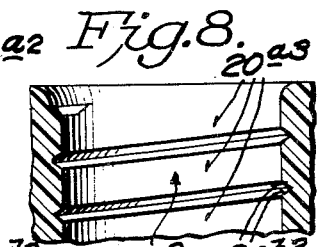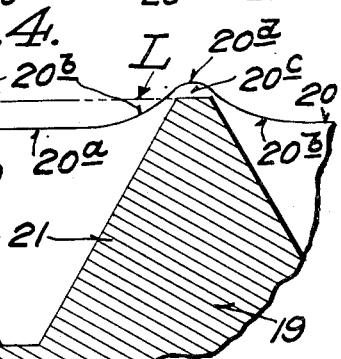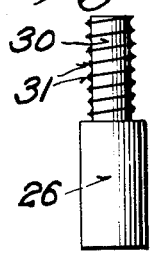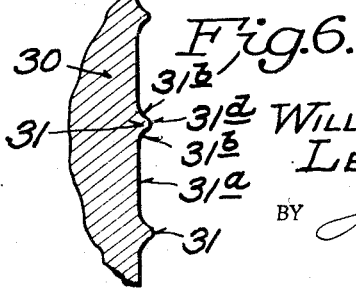

United States Patent Office 2,775,916
Patented Jan. 1, 1957

2,775,916

MACHINE SCREW HOLES MOLDED IN PLASTIC ARTICLES

William E. Baxter, Parkersburg, and Lewis E. Palmer, Washington, W. Va., assignors to Union Insulating Co., Inc., Parkersburg, W. Va., a corporation of West Virginia Application October 7, 1953, Serial No. 384,596

9 Claims. (Cl. 85—32)

This invention relates to the formation of screw threads in plastic materials, and more particularly to the molding of threaded holes and openings to receive standard metal machine screws of small sizes, in articles made of thermoplastic materials, thermosetting materials and other materials that can be molded or cast.

One type of plastic articles in which the invention may be used are outlet and junction boxes, plaster rings, covers for boxes, caps for lamp sockets and other articles and parts made of thermosetting plastic material such as phenolic resin.

In the manufacture of such insulating articles and parts for electrical uses, standard metal machine screws are used to connect parts, and it has been necessary to tap the holes or openings in such plastic parts to receive the V-shaped threads of metal screws. That has not only been an expensive operation, but there are many problems in tapping plastic parts which have for years worried everyone who has had to do this work. Some of the problems are: breakage because of the brittleness of the plastic part; poor threads because of the tendency of the taps to cut out the threads as they are removed from the holes due to the low strength of the plastic and the tendency of the tap to cut a wider groove if there is any pull on it as it is removed from the hole; poor tap life because of the abrasive nature of most plastic materials, particularly of the thermosetting type; and disagreeable working conditions where the tapping is done because of the dust created by the tapping operation. There is also the danger of the threads being too small unless special over size taps are used because of the abrasive nature of the material reducing the size of the tap, and the tendency of the material to form a thread which is a very tight fit on the tap used. This latter tendency also results in heating of the tap, which further complicates the problem, and may under some conditions heat the tap to a point where it will damage the material.

There has been a great deal of effort in the past to find ways of getting around these troubles, ranging all the way from grinding the taps off center to make them cut larger holes, to special compounding of materials to improve the tapping qualities. Over-size taps, nitrited taps, special flute forms, taps of special alloy steels and of carboloy, as well as compressed air blast on the taps have been used with some excess, but often the thing used to help the tapping problem has either increased the cost or created problems which were as bad or worse than the tapping problem.

It has long been known that thermosetting plastic materials such as phenolic resin have a temporary elasticity immediately after they are molded under heat and pressure between shaping dies, and that such temporary elasticity is sufficient to permit a molded article to be removed from the dies which have only a straight line movement toward and from each other, even if the article has a slight projection or recess extending transversely to the direction of separation of the article from the die parts. And for many years plastic bottle caps with internal screw threads have been molded in such presses in accordance with the Scribner Patent No. 1,916,692, July 4, 1933, the thread-forming pins being stripped from the recessed caps without damaging the internal screw threads, if the removal takes place while the caps are still hot and before the plastic material takes its final set. The molded threads in such plastic bottle caps fill the valleys of the threads on the neck of the bottle and are of course pitch and of the round thread form such as on the base of an electric lamp bulb and in the sheet metal screw shell in a lamp socket for such a lamp bulb. An example of such round molded threads in plastic bottle caps is shown in the Scribner Patents No. 1,916,629 (Reissue No. 19,000) and No. 1,916,693, July 4, 1933. Because of the coarse pitch and the shortness of the height or length of the bottle cap there are but few turns of the thread, the length of the threaded portion being usually a small part of the diameter of the cap. In contrast to such molded and stripped bottle cap threads, the threads of the present invention receive the V threads of the small sizes No. 10 or smaller with 24 or more threads per inch of metal machine screws of American Standard form, consist of many turns so that they usually extend along the molded hole many times the diameter of the metal screw, and only extend into the metal threads a distance sufficient to give the necessary holding power.

It is impossible to strip from a thermosetting plastic such as phenolic resin the thread forms of the standard V-type used on metal screws, but after a great deal of experimental work we have discovered it is possible to strip a modified thread form; and that, because of the fact that the metal machine screw is made of material with much higher strength per unit of area than the plastic material, it is possible to strip such a molded thread which will have substantially the same holding power as a thread machined to the standard V form, although the actual depth of the molded thread is only a small fraction of the depth of a V thread which is machined in a hole in a plastic part.

Our new form of plastic thread is characterized by its shallowness as compared with its width, that is, the distance from valley to valley, so that when the threads are mated with V threads of metal, the body of plastic material disposed between next adjacent tips of metal threads will be long in the direction of the axis of the threads but very thin in the radial direction. The depth of the plastic threads is only a fraction of the depth of the metal V-threads, and hence the plastic threads project only to a limited extent into the spaces between the metal threads, and only the crest portions or tips of the metal threads extend into the shallow angular valleys of the plastic threads. While the crests of the metal threads engage the valleys of the molded threads in the same manner in which these parts of male and female threads made of metal are engaged, and the usual clearances are allowed for variations in manufacture, our molded threads project into the spaces between the metal V threads to only a very limited extent as compared with tapped plastic V threads which substantially fill the spaces between the metal threads. As above noted, such shape of the molded thread disposes between the tips of the metal threads a body of plastic material which is long and gives the molded threads sufficient holding power on the metal threads and which is thin in a radial direction so that the molded threads may be stripped from a molding pin. Since it is that body of plastic material between the metal threads that must be sheared by the harder threads of the metal screw if the latter were to be forcibly pulled out of the hole, the holding power of our molded threads will be substantially equal to machined plastic V threads, and even greater because molded threads have a more dense resin surface than V threads that have been cut in the plastic material by a standard tap.

The objects of the invention are to greatly reduce the cost of making threads in plastic articles, particularly in holes or openings in such articles, and to improve the quality of machine-screw receiving threads in plastic articles.

With the above and other objects and advantages in view, the invention resides in the novel procedure, the novel combinations and arrangements of parts and the novel features of construction hereinafter described and claimed, and illustrated in the accompanying drawings which show the present preferred embodiments of the invention.

In the drawings:

Fig. 1 is a perspective view of a molded plastic outlet box made in accordance with the invention;

Fig. 2 is an enlarged detail vertical section through one end of the box;

Fig. 3 is a detail section showing a machine screw in a hole with the molded threads and while this view is on an enlarged scale the latter is too small to correctly show the molded threads;

Fig. 4 is a detail view showing the present preferred form of our moulded thread mated with a standard 60 degree machine screw thread, the threads being greatly enlarged but approximately to scale;

Fig. 5 is a detail side elevation on an enlarged scale of the molding pin for shaping the plastic threads shown in Fig. 4;

Fig. 6 is a further enlarged detail section showing the profile of the molding threads on the pin shown in Fig. 5;

Fig. 7 is an enlarged detail section showing one extreme form of our improved molded threads;

Fig. 8 is a view similar to Fig. 7 showing another extreme form of our improved threads;

Figure 9:
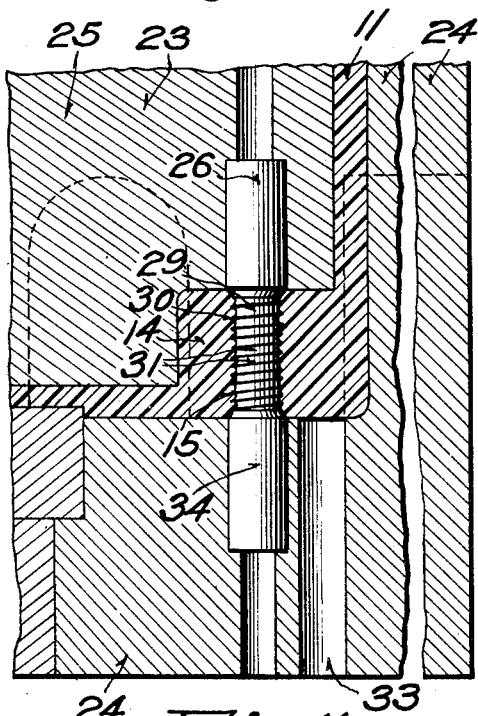
Fig. 9 is a detail section through a portion of a molding apparatus for molding the screw threads, the mold being shown closed.

Referring to the disclosure shown in Figs. 1–6 of the drawings, the numeral 10 denotes as a whole an outlet box molded of a thermosetting plastic such as phenolic resin, but it is to be understood that it is only one plastic article or part in which the invention may be embodied. The box is of rectangular shape with an open top or outer face to be closed by a cover or a member on which an electrical device or fixture may be mounted. The box may have both its side walls 11 and end walls 12 near its bottom provided with thin portions forming knock-outs 13 for the entrance of electric cables. On the inside opposite the knock-outs, the bottom is thickened as at 14 to form seats against which the cables may be fastened by the usual metal clamps, the clamps being fastened by metal machine screws in a manner similar to that shown in the W. M. Parker Patent No. 2,352,913, July 4, 1944. These clamping screws are turned into holes 15 which are formed in the thickened portions 14 and which have molded threads as hereinafter described. The walls 12 along their upper portions are thickened to form reenforcements 16, and adjacent the central portions of the latter are laterally projecting lips or ears 17 with screw holes 18, also with the same kind of molded threads, to receive machine screws for the attachment of a cover plate, an electric fixture or any part to be fastened to the box or other article.

The molded threads in the holes or openings 15 and 18 are of special design so that they may be stripped from threaded molding pins of special design in a standard molding press and will receive metal screws with standard V-shaped threads and have substantially the same hold power as V threads tapped in holes of such plastic compositions. In Fig. 3 is shown a standard machine screw 19 turned into one of the holes 18 to fasten a cover plate or other part 10' on the top of the box; and it will be understood that similar screws are used in the holes 15 to fasten the cable clamps. These screws have many turns of fine threads and hence the molded threads extend along a length greater than the diameter of the hole. The later of course, need not extend entirely through the plastic part.

Our improved threads may take different forms or shapes between the two extremes shown in Figs. 7 and 8, but the preferred form is shown in Fig. 4. The threads 20 have wide and flat or substantially flat crests $20^a$ and curved flanks or sides $20^b$, which form substantially V-shaped valleys $20^c$, the bottoms of the latter being rounded at $20^d$. The curvature of the sides $20^b$ may vary but as shown in Fig. 4, the two sides of a tooth have a length approximately two thirds of the pitch, the remaining third being the flat crest $20^a$. The angle formed between the sides must be at least 60° since the valleys $20^c$ receive little more than the crest portions of the metal threads 21 of the screw 19, as seen in Fig. 4. The threads 20 are very shallow, their depth being approximately one sixth of the depth of the metal threads 19 and hence they project into the space between the threads 19 to an extremely small extent, as compared with prior molded plastic threads. That permits the threads 20 to be stripped from the molding pins which shape them as hereinafter set forth. The form of threads $20^2$, as shown in Fig. 7 differs from the preferred form in that the sides $20^{b2}$ have curves of greater radius which meet at the crests $20^{a2}$, and the bottoms of the 60° valleys $20^{d2}$ are not rounded. The form of threads $20^3$ shown in Fig. 8 have straight sides $20^{b3}$ set at an angle of 60° and the crests $20^{a3}$ are flat. In each of the three forms the angular valleys are substantially 60° and the depth of the molded plastic threads is only approximately one sixth of the depth of the metal threads of the screw 19. That depth of the molded threads is critical because if the depth is substantially greater the molded threads cannot be stripped from the molding pin and if substantially less the threads will not have sufficient holding power on the metal screw. It will be further noted on reference to Fig. 4 that the depth of the molded threads, that is, the distance between planes passing through the crests and the bottoms of the valleys, is approximately one sixth of the pitch or distance from crest to crest and hence the threads are extremely shallow as compared with both plastic and metal prior threads. While the forms shown in Figs. 7 and 8 may be stripped we have had better results with the preferred form in the molding of threaded holes for the screw sizes to which the invention is applicable namely small machine screws No. 10 or smaller with 24 or more threads per inch of the American Standard.

In Fig. 4 the dot and dash line L between the crests of adjacent metal threads 21 show the path that would have to be sheared through the plastic material by the tips of the threads of the metal screw if the latter were forcibly pulled out of the threaded hole. It is to be noted that the body of plastic material within the line L is small in thickness, that is, in a radial direction, but it is long in length, that is, in the direction of the axis of the hole and the screw, since it extends substantially from crest to crest of adjacent threads 21. Hence the threads 20 will have practically the same holding power as a V thread machined in plastic material. Because of the very much greater strength in shear of metal over the plastic material, the screw will actually shear the material to the full diameter of the metal screw, and hence adding more material to fill the space within the V of the metal thread by an extension of the plastic thread will not substantially add to the strength of the molded thread. The strength of our molded threads over that of threads tapped in such plastic materials, is increased because of the fact that the molded surfaces of phenolic resin products have a resin film or surface more dense than that of the material beneath the molded surface. Hence the actual force required to shear the metal thread through this more dense surface area will be greater than it would be to shear a similar sized thread machined into the plastic by a standard tap which would of course remove the molded surface.

In the manufacture of machine screws the threads are normally made with some clearance between the male and female parts to allow for variations in the manufacture of the parts, and we have followed this procedure in making our molded threads. The threads in a hole for any given size of screw must be able to hold all variations of that size screw, and it is only when the metal screw is at the very top of its allowable tolerance that the fit becomes tight enough to give any binding in our molded threads. In making the thread so that it will perform satisfactorily on all variations of a given size screw, the internal diameter of the molded thread must be a few thousandths of an inch less than the outside diameter of the smallest screw that will be used with the molded thread, the major diameter of the molded thread must be at least as large as the major diameter of the largest screw that will be used with the molded thread, and the maximum depth of the thread groove or valley must be such that the threads can successfully be stripped from the molding pin. That depth varies for different sized screws. For example for 6–32, 8–32 and 10–24 screws the depth is approximately .007" for general purpose phenol-formaldehide molding material marketed by General Electric Company, Bakelite Division of Union Carbide and Carbon Company and others. The major diameter of these sizes of screws varies approximately .005", and hence a molded thread with grooves approximately .004" deep of the correct diameter will successfully hold the machine screw. However, we have found that if our diameter is off as much as .004" or .005", or if our thread depth is as much as .002" shallow, the molded thread will not function correctly with all variations in sizes of screws. As above noted it is desirable that the molded threads hold all variations in screws of a given size but we have made threads which, while having good holding power on some screws, will permit the metal threads of the screw to ratchet over them, if the screw is turned tight enough in the molded thread hole, rather than shear the thread out as would occur if a screw is turned too tightly into a tapped hole. This happens when the projection of the plastic threads into the metal threads is so small that the elasticity of the material will allow them to deform sufficiently for the threads to slip past each other without actually shearing the plastic. While such threads had very good holding power and would slip over in this manner a number of times with no apparent damage to either the molded threads or the screw, they would not hold satisfactorily all screws of a given size. From the foregoing it will be understood the invention is applicable to small size screws such as No. 10 or smaller American Standard machine screw sizes.

The molded threads 20 are made directly in finished form by a simple molding and stripping operation. They are made when the entire box or article is molded out of phenolic resin or similar thermosetting composition in a standard form of press having the usual upper and lower mold assemblies relatively movable in a straight line. Portions of one form of molding apparatus in which the article may be made under heat and pressure are conventionally shown in Figs. 9 and 10. The stationary member or assembly of the mold has die parts 24 which mold the exterior of the box, while the movable member or section 23 has a core portion 25 which shapes the interior of the box. While the movable member 23 is shown as the upper member of the press, it will be understood that the stationary member 24 may be the upper member depending upon the design of the press. The core portion 25 carries pins 26 which mold the holes 15 in the bottom portion of the box while similar pins (not shown) mold the holes 18. These pins which mold the holes 18 may be carried by a die plate (not shown) which forms the open upper edge of the box and which moves with the member 23.

One of the molding pins which mold the holes 15 and 18 is shown on an enlarged scale in Fig. 5 and the profile of its molding portion is shown on a larger scale in Fig. 6. The pin 26 has a body portion suitably fixed in one of the members or assemblies of the press and a reduced cylindrical stem 30 which is formed with a spiral rib forming special threads 31 to shape the molded threads 20 shown in Fig. 4. It will be seen that the profile of the molding portion of the pin is the same as the profile of the threads 20. The thread convolutions 31 are therefore widely spaced and shallow or low in height. They are substantially V-shaped in cross section but have rounded crests 31$^d$, and curved sides 31$^b$ which form wide shallow valleys with flat bottoms 31$^a$, the depth of the threads being approximately one sixth of the depth of the threads of the screw 19.

In molding the article the charge of molding composition is placed between the two members and they are then closed to the position shown in Fig. 9. Under heat and pressure the composition fills the mold cavity. After the proper time interval and while the molded article is still hot, the member 23 is moved to the position shown in Fig. 10 to strip the threaded molding pins from the holes 15 while the article remains in the member 24. On further upward movement of the member 23, slidable ejector pins (not shown) in the openings 33 lift the article out of the cavity in the section 24 to strip the molding pins from the holes 18. The ejector pins operate in timed relation with the movement of the member 23 in the usual manner of presses of this character. The operation can, of course, be made in reverse order, that is, the molded part pulled from the lower cavity with the top member and then ejected from the latter. If desired countersinks may be formed at each end of the holes or openings 15 and 18 by suitably shaping portions of the pins 26 in one member and providing pins 34 in the other as will be understood by reference to Figs. 9 and 10.

The formation of the finished screw threads in the screw holes of plastic outlet and junction boxes or other articles and parts molded of synthetic resins such as Bakelite at the time of the molding of the articles is of great economic value since the art has long sought means for overcoming the expensive and troublesome operation of tapping screw threads in the holes of plastic articles for the reception of machine screws. Aside from the cost of making the threaded molding pins, the use of the invention adds nothing to the cost of making the articles, and it effects a great saving in labor costs and in the costs of machinery and its upkeep.

Figure 11:
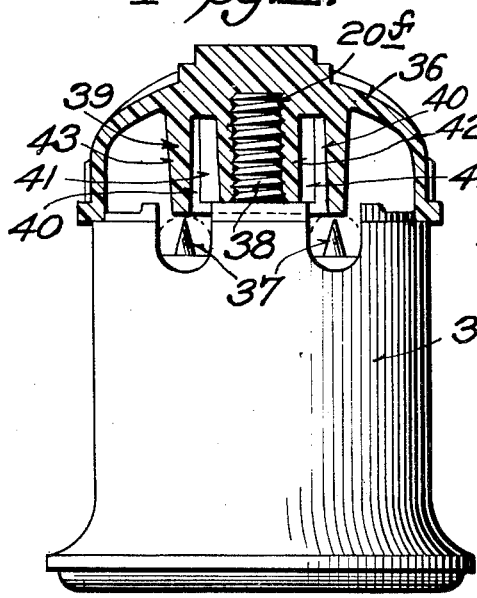
Fig. 11 is a view on an enlarged scale partly in elevation and partly in section of a plastic lamp socket showing its cap molded in accordance with the invention.
Figure 12:
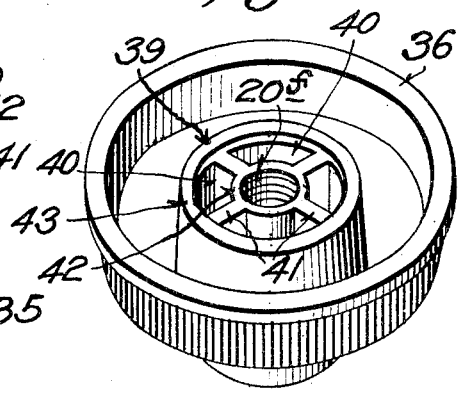
Fig. 12 is a perspective view of the bottom of the cap shown in Fig. 11.

There are other advantages gained by the use of the invention and one of them will be seen on reference to Figs. 11 and 12 which show a screw fastened cap 36 on an electric lamp bulb socket 35. The socket is of the well known pin-tap-conductor type. It has grooves across the top of the body for the insulated conductors which are pierced by the pins 37 and clamped down thereon by the cap 36. Molded in the center of the top of the plastic body of the socket is a metal screw 38 with standard V threads for the attachment of the cap. The caps are also molded of phenolic resin and in the past they had at the center of their bottom faces large cylindrical bosses with holes that were tapped to receive the screws 38. To provide the necessary strength for tapping the holes, the bosses had to be made heavy and solid. When the cap is made in accordance with our invention, and as shown in the drawing, the screw hole is formed with molded screw threads 20^f like the threads 20, and the cylindrical boss 39 may be of hollow formation having an annular series of recesses 40 separated by radial webs 41 extending between an outer ring 42 and a central portion 43 in which is molded the hole with the threads 20^f. Thus the cap may be made cheaper and from less material. At the same time it will be much better from the standpoint of molding.

While we have illustrated two applications of our invention, it may be used in connection with any molded part which requires the attachment of other parts. A few specific examples are attaching of knobs to cooking utensils, attaching cover or chassis parts to molded radio or television cabinets, and attaching of handles to trays, instruments or tools. It may also be noted that while we have described only the formation of female threads, the invention may be carried out in the manufacture of plastic parts having male threads.

In the above detailed description of the two illustrated applications of the invention, we have emphasized the use of thermosetting plastics but the invention is usable in connection with other materials that have similar properties. We believe that most if not all thermoplastic materials have characteristics that would allow a threaded pin to be stripped from them. These materials in general are softer and have more ability to deform and return to shape than do thermosetting materials. This would probably require a thread of greater depth to accomplish the same results of holding the screw.

Figure 10:
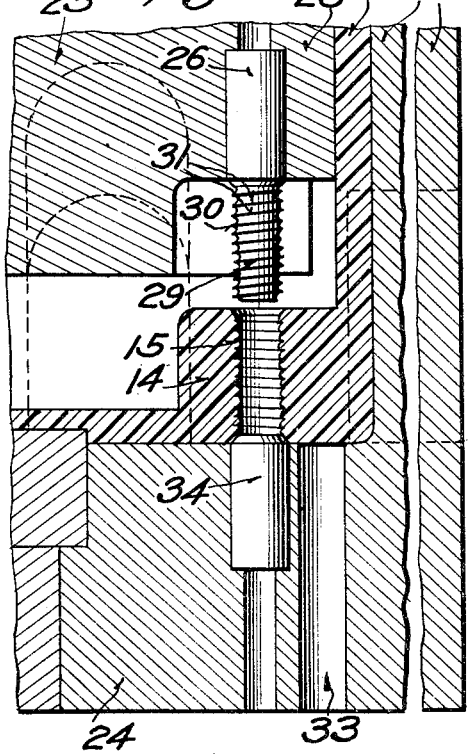
Fig. 10 is a view similar to Fig. 9 with the mold partially open to show one of the screw thread molding pins stripped from the screw hole.

In the illustrated disclosure of apparatus for forming the plastic threads, we have shown a molding apparatus of well known type but other kinds of apparatuses may be used in molding or casting the articles. Nor is it necessary that in the molding apparatus the molding pins move in a direction parallel to the opening line of the press as shown in Figs. 9 and 10, although it is always simpler to mold holes in plastic parts so that the pins can be firmly attached to either the top or bottom die section of the press. It is possible to mold the holes at any angle by so constructing the mold that the pins can be withdrawn from the plastic part before the part is removed from the particular section of the mold which carries the pins. Such pins must usually be withdrawn after the pressure is removed from the press but before the part is ejected from the particular member of the mold carrying the pins. This causes complications which usually increase both the cost of the mold and of the molding operation, but it is done when the nature of the part makes it necessary, if cost estimates show that it will be cheaper and more satisfactory to do so than it will to drill the hole and tap it after the part is molded.

While we have disclosed the preferred manner of practicing our invention, it will be understood that minor variations may be made without departing from the spirit of the invention as defined in the following claims.

We claim:

1. A molded or cast article of plastic material having screw threads for mating with V-shaped screw threads of metal, said plastic threads being molded and having a depth of approximately one-sixth of the depth of the mating metal threads, and also having substantially 60° valleys which receive only the tip portions of the V-shaped metal threads.

2. The structure of claim 1 in which said molded plastic threads have flat crests equal in width to approximately one-third of the pitch, and equally curved sides extending from the crests and forming the valleys.

3. The structure of claim 1 in which said molded plastic threads are continuously curved from the root of one valley to that of the next.

4. The structure of claim 1 in which said molded plastic threads have flat crests and straight sides forming V-shaped valleys.

5. A molded or cast article of synthetic resin molding material having molded screw threads for mating with V-shaped screw threads of small metal machine screws, said molded threads having a depth of approximately one-sixth of the depth of the mating metal threads and also having substantially 60° valleys which receive only the tip portions of the V-shaped metal threads.

6. A plastic article molded from synthetic resin molding compound having a hole with molded screw threads therein for mating with V-shaped threads of a metal machine screw, said molded plastic threads extending along said hole a distance equal to or greater than the diameter of said hole and being characterized by their extreme shallowness and their approximately 60° valleys, the valleys having a depth of approximately one-sixth of the depth of the V-shaped metal threads of a screw to be used in said hole.

7. The structure of claim 6 in which said plastic threads have an internal diameter of a few thousandths of an inch less than the outside diameter of the smallest screw of the size to be used in said hole, the external diameter of the plastic threads being at least as large as the major diameter of the largest screw of the size to be used in said hole and the depth of the plastic threads being approximately .004 of an inch.

8. A molded plastic article having a hole with molded screw threads therein to receive the V-shaped screw threads of a small metal machine screw, the article being made directly in finished form by a simple molding and stripping operation out of a synthetic resin molding composition which during the final stages of the molding operation is somewhat elastic and thereby adapted to be removed from a threaded molding pin despite interlocking of the threads of the pin with the molded threads in the hole; said article comprising a body having a hole the inner surface of which is molded to provide a length of screw threads equal to or greater than the diameter of the hole, such molded threads being characterized by their extreme shallowness and their substantially V-shaped valleys of approximately 60°, the valleys having a depth of approximately one-sixth of the depth of the metal V-shaped threads of the screw to be used in the hole.

9. A molded plastic article having a hole with molded screw threads therein to receive the V-shaped screw threads of a small metal machine screw, the said molded plastic threads having a depth of approximately one-sixth of the depth of the metal V-shaped threads of the screw to be used in the hole whereby only the tip portions of the metal threads are received in the valleys of the plastic threads.

References Cited in the file of this patent

UNITED STATES PATENTS

| | | |
|---|---|---|
| 1,916,692 | Scribner | July 4, 1933 |
| 2,133,019 | Campbell | Oct. 11, 1938 |
| 2,349,651 | Davis | May 23, 1944 |
| 2,371,365 | Tomalis et al. | Mar. 13, 1945 |
| 2,399,117 | Hart | Apr. 23, 1946 |
| 2,439,782 | Schmid et al. | Apr. 13, 1948 |
| 2,558,026 | Wilson | June 26, 1951 |
| 2,587,337 | Lay | Feb. 26, 1952 |
| 2,718,032 | Harvey | Sept. 20, 1955 |